United States Patent
Rudolph

[11] Patent Number: 5,825,136
[45] Date of Patent: Oct. 20, 1998

[54] CIRCUIT ARRANGEMENT FOR OPERATING ELECTRIC LAMPS, AND AN OPERATING METHOD FOR ELECTRONIC LAMPS

[75] Inventor: Bernd Rudolph, Munich, Germany

[73] Assignee: Patent-Treuhand-Gesellschaft fuer elektrische Gluehlampen mbH, Munich, Germany

[21] Appl. No.: 828,018

[22] Filed: Mar. 27, 1997

[30] Foreign Application Priority Data

Mar. 27, 1996 [DE] Germany .................. 196 12 170.1

[51] Int. Cl.[6] ........................................ G05F 1/00
[52] U.S. Cl. ............... 315/291; 315/224; 315/209 R; 315/307; 315/219; 315/244; 315/DIG. 7
[58] Field of Search .................... 315/291, 224, 315/307, 209 R, 244, 219, 210, 226, DIG. 4, DIG. 7

[56] References Cited

U.S. PATENT DOCUMENTS

| | | | |
|---|---|---|---|
| 4,547,706 | 10/1985 | Krummel | 315/226 |
| 5,422,546 | 6/1995 | Nilssen | 315/219 |
| 5,589,740 | 12/1996 | Rudolph et al. | 315/291 |

FOREIGN PATENT DOCUMENTS 0 113 451  10/1987  European Pat. Off. .
0 693 864 A2  1/1996  European Pat. Off. .

OTHER PUBLICATIONS

"Schaltnetzteile: Konzepte, Bauelemente, Anwendungen", Hirschmann et al, pp. 62–63.

Einfuhrung in die Elektronik, Boger et al, pp. 395–396.

*Primary Examiner*—Robert J. Pascal
*Assistant Examiner*—Haissa Philogene
*Attorney, Agent, or Firm*—Carlo S. Bessone

[57] ABSTRACT

The circuit arrangement according to the invention has a self-oscillating inverter having at least two alternately switching transistors (Q1, Q2), a load circuit connected to the inverter output and designed as a resonant circuit (L1, C1), and terminals for at least one electric lamp (LP). According to the invention, the control junction of a transistor (T1) is arranged in the emitter line of one of the inverter transistors (Q2). Via the variable conductivity of this control junction, the effective emitter resistance of the inverter transistor (Q2) is continuously varied as a function of the voltage drop across one of the resonant circuit components (C1), and the clock frequency of the inverter (Q1, Q2) is thereby increased so far that because of the now stronger detuning with respect to the resonant frequency of the resonant circuit (C1, L1) a reduction in the no-load voltage in the load circuit is achieved.

12 Claims, 2 Drawing Sheets

CIRCUIT ARRANGEMENT FOR OPERATING ELECTRIC LAMPS, AND AN OPERATING METHOD FOR ELECTRONIC LAMPS

FIELD OF THE INVENTION

The invention relates to a circuit arrangement for operating electric lamps, and to an operating method for electric lamps.

BACKGROUND OF THE INVENTION

Such a circuit arrangement is disclosed, for example, in European Patent EP 0 113 451. An inverter having a load circuit containing a discharge lamp and having a series resonant circuit connected to the inverter output is described in this publication. In order to limit the no-load voltage in this series resonant circuit, use is made of a series circuit which comprises a varistor and a capacitor and is arranged in a parallel branch relative to the resonance capacitor. The series circuit comprising the varistor and the capacitor varies the resonance capacitance active in the resonant circuit and thus ensures that the resonant frequency of the series resonant circuit is shifted independently of voltage. However, this series arrangement requires a voluminous and comparatively expensive varistor for each series resonant circuit.

SUMMARY OF THE INVENTION

It is the object of the invention to provide a circuit arrangement for operating electric lamps which ensures in as simple and cost-effective a way as possible in the load circuit connected to the inverter output an effectively controllable no-load voltage with low tolerances and, in particular, a limiting both of the no-load voltage and of the voltage with respect to the neutral conductor which satisfies the general safety requirements.

The operating method according to the invention for electric lamps in a circuit arrangement which has a self-oscillating inverter with current feedback, having at least two alternately switching transistors and a load circuit connected to the inverter output and designed as a resonant circuit, is distinguished in that a limiting of the no-load voltage in the load circuit is achieved by varying the emitter resistance or source resistance of one of the inverter transistors as a function of the voltage drop across one of the resonant circuit components, the clock frequency of the inverter thereby also being varied, with the result that the difference between the inverter clock frequency and the resonant frequency of the resonant circuit is increased.

In order to realize this operating method, according to the invention the circuit arrangement has a transistor—advantageously a field-effect transistor—whose control junction is arranged in the emitter line of one of the inverter transistors. The control input of this transistor is connected via a first current path to a voltage source and is connected, via a second current path, to a voltage divider which is connected to a resonant circuit component via a tap in the load circuit. Via the conductivity of the control junction of this transistor, that is to say the drain-source junction or the collector-emitter path, during normal operation of the circuit arrangement the emitter resistance of the corresponding inverter transistor, and thus the clock frequency of the self-oscillating inverter, is adjusted using current feedback. If, in the load circuit designed as a resonant circuit, the no-load voltage overshoots a value prescribed by the dimensioning of the circuit components, the input signal for the control electrode, that is to say the gate electrode or base electrode, of the transistor arranged in the emitter line of the inverter transistor is varied with the aid of the trigger. As a result, there is a variation in the conductivity of the drain-source junction or the collector-emitter path of this transistor, and also the emitter resistance of the corresponding inverter transistor, as well as the clock frequency of the self-oscillating inverter with current feedback. The change in the inverter clock frequency takes place in this case such that the difference between the inverter clock frequency and resonant frequency of the load circuit designed as a resonant circuit increases. This frequency detuning is attended by a reduced no-load voltage in the load circuit. The no-load voltage in the load circuit can advantageously be adjusted to the desired value by a suitable selection of voltage divider resistors which are arranged in the above mentioned first and/or second current path ending at the control input of the transistor according to the invention. The general safety requirements in accordance with the regulation EN 60 928 can be fulfilled thereby.

Thus, the clock frequency of the inverter is adjusted via the electric conductivity of the drain-source junction or the collector-emitter path of the transistor according to the invention arranged in the emitter line or source line of one of the inverter transistors in such a way that the no-load voltage in the load circuit does not overshoot the value prescribed by the dimensioning of the corresponding electronic components. A first—the negative—half-wave of the resonance capacitor voltage is advantageously employed to regulate or limit the no-load voltage.

The transistor arranged according to the invention in the emitter line or source line of one of the inverter transistors does not, however, serve only to limit the no-load voltage in the load circuit designed as a resonant circuit, but advantageously additionally also undertakes to switch off the inverter upon the occurrence of an anomalous operating state of the circuit arrangement. For this purpose, the circuit arrangement according to the invention has a bistable switching device whose output is connected via a third current path to the control input of the transistor arranged in the emitter line or source line of one of the inverter transistors, while there is present at the input of this bistable switching device an electric voltage which is proportional to the time-averaged second—the positive—half-wave of the resonance capacitor voltage of the load circuit.

Thus, the transistor according to the invention arranged in the emitter line or source line of one of the inverter transistors undertakes two different functions.

During normal operation of the circuit arrangement, it operates as an element controlled in analog fashion by virtue of the fact that it assumes different low-resistance states depending on the no-load voltage in the load circuit and thereby varies the inverter clock frequency, while given the occurrence of a fault it operates as a switch and goes over into the high-resistance state in order to interrupt the oscillation of the inverter.

BRIEF DESCRIPTION OF THE DRAWINGS

The invention is explained below in more detail with the aid of a preferred exemplary embodiment. In the drawing.

BEST MODE FOR CARRYING OUT THE INVENTION

Figure 1:
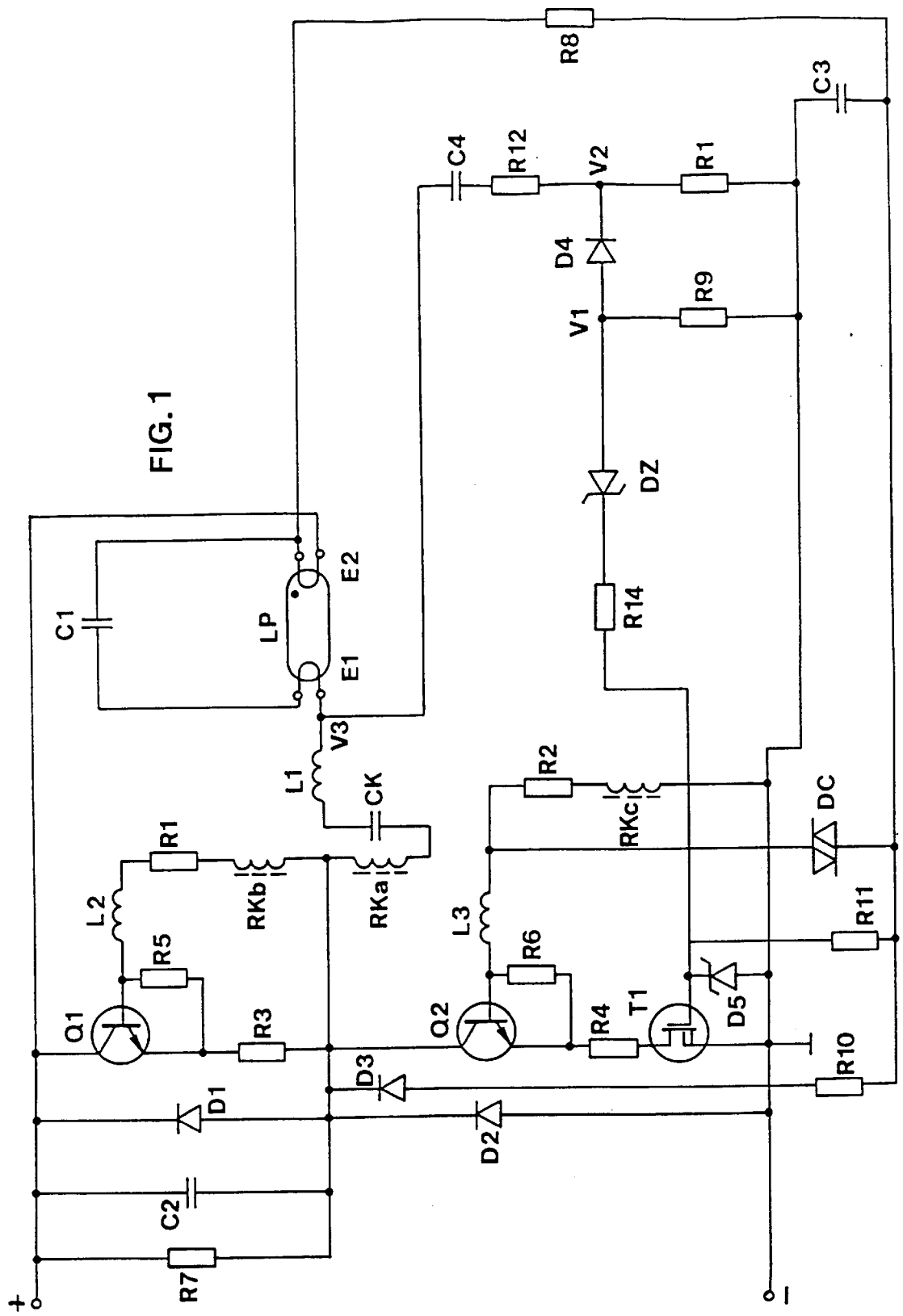
FIG. 1 shows a diagrammatic sketched circuit diagram of the principle of the invention.

The principle of the circuit arrangement according to the invention is explained below in more detail with the aid of FIG. 1, which shows a diagrammatic sketched circuit diagram for the operation of a low-pressure discharge lamp. This circuit arrangement has a half-bridge inverter fitted with two bipolar transistors Q1, Q2. The two bipolar transistors Q1, Q2 are respectively equipped with a freewheeling diode D1, D2 which are connected in parallel with the collector-emitter path of the corresponding transistor Q1, Q2. In addition, the two bipolar transistors Q1, Q2 respectively have an emitter resistor R3, R4 and a base-emitter parallel resistor R5, R6. An ohmic resistor R7 and a capacitor C2 are, furthermore, connected in parallel with the collector-emitter path of the transistor Q1.

The two switching transistors Q1, Q2 of the half bridge are driven by means of a toroidal-core transformer which has one primary winding RKa and two secondary windings RKb, RKc. The primary winding RKa is integrated into the series resonant circuit of the half-bridge inverter, which is connected to the centre tap M of the inverter and contains the coupling capacitor CK, the resonance inductor L1 and the resonance capacitor C1. The secondary windings RKb, RKc are respectively integrated into the base-emitter circuit of an inverter transistor Q1, Q2 and connected in each case via a base series resistor R1, R2 and an inductor L2, L3 to the base terminal of the relevant bipolar transistor Q1, Q2. The half-bridge inverter further has a starting device which essentially comprises the diac DC and the starting capacitor C3. The diac DC is connected via the conductor L3 to the base terminal of the inverter transistor Q2. One terminal of the starting capacitor C3 is connected to the negative pole of the inverter DC voltage supply, while its other terminal is connected, on the one hand, via an ohmic resistor R10 and a rectifier diode D3 to the centre tap M of the half bridge and, on the other hand, via an ohmic resistor R8 and the electrode coil E2 of the low-pressure discharge lamp LP to the positive pole of the inverter DC voltage supply.

The fluorescent lamp LP to be operated is connected in parallel with the resonance capacitor C1. One terminal of the first electrode coil E1 of the lamp LP is connected to the resonance inductor L1, while the other terminal of the first electrode coil E1 is connected to the resonance capacitor C1. One terminal of the second lamp electrode coil E2 is connected to the positive pole of the inverter DC voltage supply, and the other terminal of the second lamp electrode coil is connected via an ohmic resistor R8 to the starting capacitor C3.

To this extent, the circuit arrangement corresponds to a half-bridge inverter as described, for example, on pages 62–63 of the book entitled "Schaltnetzteile" ["Switched-mode power supplies"] by W. Hirschmann/A. Hauenstein, publisher Siemens AG.

After switching on, the starting capacitor C3 is charged to the breakdown voltage of the diac DC, which then generates trigger pulses for the base of the bipolar transistor Q2 and thereby causes the half-bridge inverter to oscillate. After the transistor Q2 has switched through, the starting capacitor C3 is discharged via the resistor R10 and the diode D3 so far that the diac D3 no longer generates trigger pulses. The two inverter transistors Q1, Q2 switch alternately, with the result that the centre tap M of the half bridge is alternately connected to the positive pole or negative pole of the DC voltage supply. The recharging of the coupling capacitor CK brought about thereby causes in the series resonant circuit and in the lamp LP a mid-frequency alternating current whose frequency corresponds to the clock frequency of the half-bridge inverter. The clock frequency of the half-bridge inverter is normally more than 20 kHz. The electronic components of the circuit arrangement according to the invention are, furthermore, dimensioned such that the clock frequency of the self-oscillating half-bridge inverter is above the resonant frequency of the series resonant circuit L1, C1.

Connected into the emitter line of the second half-bridge transistor Q2 is a field-effect transistor T1 with the aid of which the effective emitter resistance of the second half-bridge transistor Q2 can be varied. The drain terminal of this field-effect transistor T1 is connected via the emitter resistor R4 to the emitter of the switching transistor Q2. The source terminal of the field-effect transistor T1 is earthed or connected to the negative pole of the DC voltage supply of the inverter. The gate of the field-effect transistor T1 is connected to the negative pole of the DC voltage supply via, on the one hand, a zener diode D5 serving as overvoltage protection and, on the other hand, via an ohmic resistor R14, a zener diode DZ, a branching point V1 and an ohmic resistor R9. The branching point V1 is connected to a tap V3 in the series resonant circuit via a rectifier diode D4 polarized opposite to the zener diode DZ, a further branching point V2, an ohmic resistor R12 and a capacitor C4. The tap V3 is situated between the resonance inductor L1 and the resonance capacitor C1. The discharge path of the low-pressure discharge lamp LP is arranged in parallel with the resonance capacitor C1. The branching point V2 is connected to the negative pole of the DC voltage supply via an ohmic resistor R13. The ohmic resistors R9, R12 and R13 form a voltage divider which is arranged in parallel with the resonance capacitor and the lamp LP in terms of alternating current via the capacitor C4.

When the circuit arrangement is switched on, before the inverter is started, the field-effect transistor T1 is controlled to be of low resistance via the electrode coil E2 and the resistors R8 and R11, which connect the gate of the field-effect transistor T1 to the positive pole of the DC voltage source. The diac DC transmits trigger pulses to the base of the second half-bridge transistor Q2 and thus, as already described above, causes the half-bridge inverter to oscillate. In the normal case, the low-pressure discharge lamp will then ignite after a short time. At the tap V3 in the series resonant circuit, the voltage drop across the resonance capacitor C1 or across the lamp LP is detected by the voltage divider R9, R12, R13 and divided down in accordance with the resistance values of these ohmic resistors. As long as the amplitude of the resonance capacitor voltage undershoots a critical value, which can be adjusted to a desired value by a suitable dimensioning of the resistors R9, R13 and R14, the zener diode DZ, and thus also the current path which leads, starting from the gate of the field-effect transistor T1, via the resistor R14, the zener diode DZ and the ohmic resistor R9 to the negative pole of the DC voltage source, remain de-energized, and the field-effect transistor T1 receives its full control signal via the resistors R8 and R11. If the amplitude of the resonance capacitor voltage reaches this critical value, upon traversal of the negative half-wave of the resonance capacitor voltage the voltage drop between the gate of the field-effect transistor T1 and the branching point V2 rises so far that the zener diode DZ becomes conductive. As a consequence of this, the gate of the field-effect transistor T1 receives only a reduced control signal via the resistors R8 and R11, since a portion of this control signal flows off to the negative pole of the DC voltage source via the resistor R14, the zener diode DZ, which is now conductive, and the voltage divider resistors R9 and R13, which are now connected in parallel. The rectifier diode D4 is polarized such that the zener diode DZ reacts sensitively only to the negative half-wave of the resonance capacitor voltage. The strength of the remaining control signal can, given otherwise unchanged parameters, be adjusted through the dimensioning of the resistors R9 and R14. A reduced control signal for the gate of the field-effect transistor T1 reduces the conductivity of the drain-source junction of the field-effect transistor T1 and thus increases the effective emitter resistance of the bipolar transistor Q2, since the effective emitter resistance is essentially an additive combination of the resistance value of the ohmic resistor R4 and the resistance value of the drain-source junction of the field-effect transistor T1. The consequence of an increased emitter resistance is that the toroidal-core transformer RK reaches its magnetic saturation flux density more quickly, and that thereby the on duration of the half-bridge inverter transistor Q2 is correspondingly shortened. Thus, an increase in the effective emitter resistance leads to a corresponding higher clock frequency of the half-bridge inverter. Since the clock frequency of the half-bridge inverter is higher than the resonant frequency of the series resonant circuit, an increase in the inverter clock frequency leads to an increase in the frequency detuning between the resonant frequency of the series resonant circuit L1, C1 and the clock frequency of the half-bridge inverter Q1, Q2. The no-load voltage in the series resonant circuit connected to the inverter output M is thereby reduced.

Figure 2:
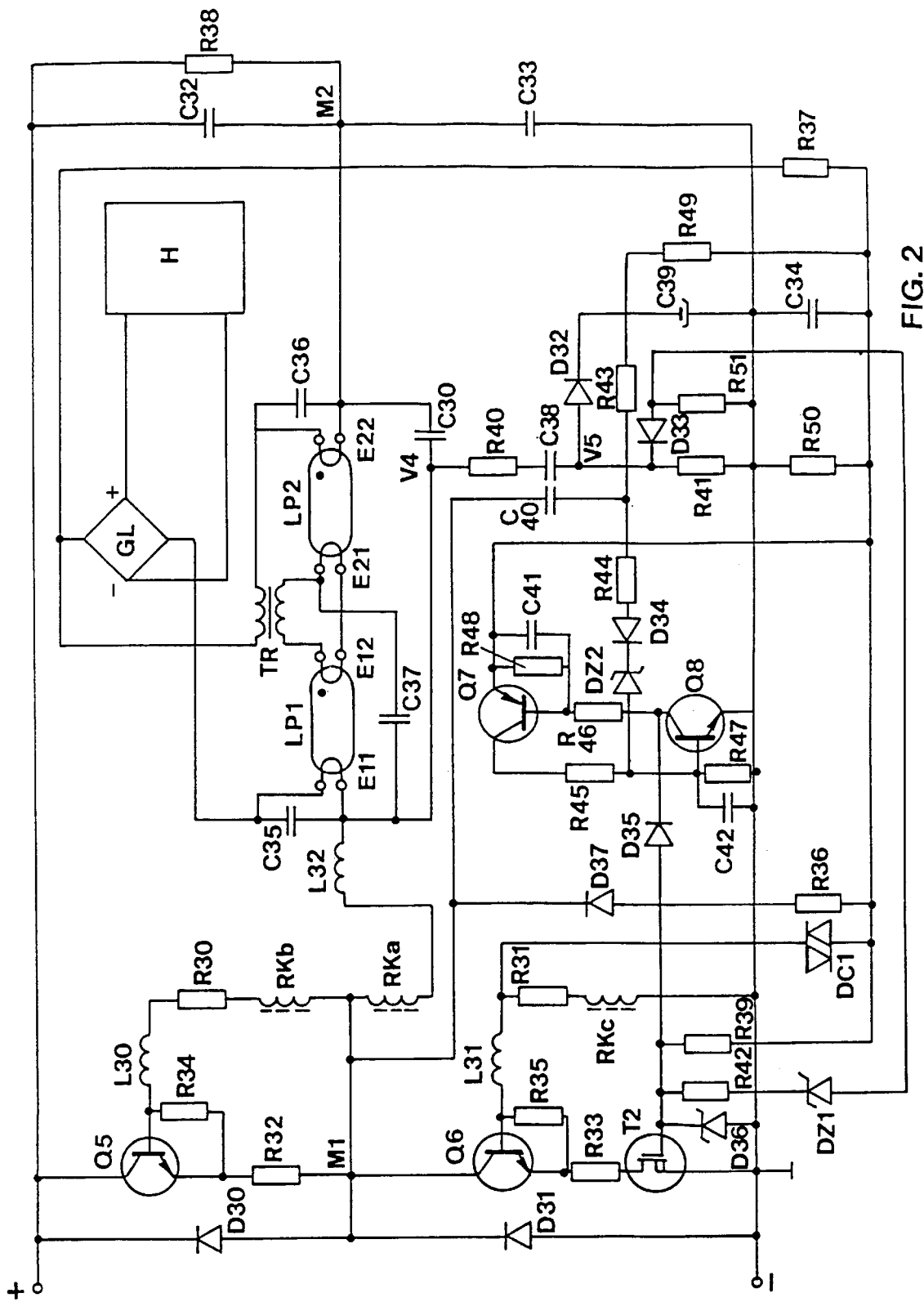
FIG. 2 shows a preferred exemplary embodiment of the circuit arrangement according to the invention.

The complete circuit diagram of a circuit arrangement according to the invention for operating two low-pressure discharge lamps is represented in FIG. 2. A suitable dimensioning of the electronic components illustrated here is given in the table. This circuit arrangement has a self-oscillating half-bridge inverter with current feedback, which is essentially formed by two bipolar transistors Q5, Q6, the toroidal-core transformer RKa, RKb, RKc, the base series resistors R30, R31 and the emitter resistors R32, R33, and is fed with a DC voltage. This DC voltage is obtained here from the mains voltage in a known way by rectification and subsequent smoothing. The bipolar transistors Q5, Q6 are equipped in each case with a freewheeling diode D30, D31 which is connected in parallel with the collector-emitter path of the corresponding half-bridge transistor Q5, Q6. Furthermore, the two bipolar transistors each have a base-emitter parallel resistor R34, R35 and an inductor L30, L31, which is connected in series with the base series resistor R30, R31 and is connected to the base terminal of the corresponding half-bridge transistor Q5, Q6. A series resonant circuit which contains the primary winding RKa of the toroidal-core transformer, the resonance inductor L32 and the resonance capacitor C30 is connected to the output of the half-bridge inverter, that is to say between the centre tap M1 of the half-bridge inverter transistors Q5, Q6 and the centre tap M2 of the two coupling capacitors C32, C33.

Two low-pressure discharge lamps LP1, LP2 connected in series relative to one another are arranged in parallel with the resonance capacitor C30. the electrode coils E11, E12 and E21, E22 of these two lamps are preheated before starting the lamps with the aid of a heating device H and a heater transformer TR. For this purpose, the electrode coil E11 of the first low-pressure discharge lamp LP1 and the electrode coil E22 of the second low-pressure discharge lamp LP2 are arranged, together with the primary winding of the heater transformer TR, the bridge rectifier GL and the heating device H, in a first common heating circuit, while the other electrode coil E12 of the first low-pressure discharge lamp LP1 and the other electrode coil E21 of the second low-pressure discharge lamp LP2 form a second heating circuit together with the secondary winding of the heater transformer TR. The electrode coils E11 and E22 respectively have a capacitor C35, C36 connected in parallel. A starting capacitor C37 is connected in parallel with the low-pressure discharge lamp LP1. The heating device H is described in detail in Offenlegungsschrift EP 0 693 864.

The self-oscillating half-bridge inverter is driven with the aid of the toroidal-core transformer, whose secondary windings RKb, RKc are respectively arranged in the base line of one of the half-bridge inverter transistors Q5, Q6. Starting the half-bridge inverter is rendered possible by a starting circuit which is connected to the base terminal of the second half-bridge inverter transistor Q6 and essentially comprises the diac DC1, the starting capacitor C34, the ohmic resistor R36 and the diode D37. One terminal of the starting capacitor C34 is connected to the negative pole, which is at system earth of the half-bridge inverter DC voltage supply, while its other terminal is connected to the positive pole of the DC voltage supply via the ohmic resistor R37, the primary winding of the heater transformer TR, the electrode coil E22 of the low-pressure discharge lamp LP2 and the ohmic resistor R38.

The drain-source junction of a field-effect transistor T2 is arranged in the emitter line of the half-bridge inverter transistor Q6, in series with the emitter resistor R33. The gate of this field-effect transistor T2 is connected to the positive pole of the DC voltage supply of the half-bridge inverter via the resistors R39 and R37, the primary winding of the heater transformer TR, the electrode coil E22 of the low-pressure discharge lamp LP2 and the ohmic resistor R38.

The circuit arrangement further has a branch which is connected in terms of alternating current in parallel with the resonance capacitor C30 and with the low-pressure discharge lamps LP1, LP2 and which is connected to the tap V4 in the resonant circuits and connected to system earth or to the negative pole of the DC voltage supply via the resistor R40, the capacitor C38, the branching point V5, the diode D32, which is polarized in the forward direction, and the capacitor C39. The branching point V5 is, moreover, connected to the negative pole of the DC voltage supply via the resistor R41, and to the gate of the field-effect transistor T2 via the diode D33, which is polarized in the reverse direction, the zener diode DZ1 and the resistor R42. The ohmic resistors R40, R41 and the resistor R51, which is connected in parallel with the resistor R41 via the diode D33, form a voltage divider which detects the voltage drop across the resonance capacitor C30. Connected to the centre tap M1 of the half-bridge inverter is a capacitor C40 which is connected to a terminal of the capacitor C39 via the branching point V6 and via the resistor R43. The branching point V6 is connected via the resistor R44, the diode D34, which is polarized in the forward direction, and the zener diode DZ2 to the input of a bistable switching unit. The bistable switching unit comprises two bipolar transistors Q7, Q8, the resistors R45, R46, R47, R48 and the capacitors C41, C42. These aforesaid components form a thyristor equivalent circuit whose design and mode of operation are described, for example, in the book entitled "Bauelemente der Elektronik und ihre Grundschaltungen" ["Electronic components and their basic circuits"], pages 395–396, by H. Höger, S. Kähler, G. Weigt from the series "Einführung in die Elektronik", Volume 1, Verlag H. Stam GmbH, 7th edition. The output of this bistable switching unit is connected to the gate of the field-effect transistor T2 via the diode D35, which is polarized in the reverse direction. The two high-resistance resistors R49 and RS0 render it possible for the capacitors C39 and C34 to be discharged after the half-bridge inverter has been switched off. A zener diode D36 which limits the voltage drop to approximately 12 V is connected in parallel with the gate-source junction of the field-effect transistor T2.

The mode of operation of the circuit arrangement illustrated in FIG. 2 is described below.

Directly after the circuit arrangement is switched on, the drain-source junction of the field-effect transistor T2 is controlled to be of low resistance via the resistor R38, the electrode coil E32, the primary winding of the heater transformer TR and the resistors R37 and R39. At the same time, the starting capacitor C34 is charged to the breakdown voltage of the diac DC1 via the resistor R38, the electrode coil E22, the primary winding of the heater transformer TR and the resistor R37, with the result that the diac DC1 generates trigger pulses for the base of the bipolar transistor Q6 and thereby causes the half-bridge inverter to oscillate. After the half-bridge inverter transistor Q6 has been switched through, the starting capacitor C34 is discharged via the resistor R36 and the diode D37 so far that the diac DC1 does not generate any further trigger pulses. The two inverter transistors Q5, Q6 switch alternately, with the result that their centre tap M1 is alternately connected to the positive pole and negative pole of the DC voltage supply of the high-bridge inverter. The result of this is to generate in the series resonant circuit L32, C30, which is arranged between the centre tap M1 of the half-bridge inverter and the centre tap M2 of the coupling capacitors C32, C33, a mid-frequency alternating current whose frequency corresponds to the switching frequency of the half-bridge inverter. The heating device H and the heater transformer TR ensure that the electrode coils E11, E12, E21, E22 are sufficiently preheated with the aid of a heating current before the ignition of the low-pressure discharge lamps LP1, LP2. The mode of operation of the heating device is explained in detail in European Offenlegungsschrift EP 0 693 864.

According to the invention, the field-effect transistor T2 fulfills two different functions. Firstly, it is used to limit or regulate the no-load voltage in the series resonant circuit, and secondly it is utilized to switch off the half-bridge inverter as a safety measure upon the occurrence of an anomalous operating state, for example in the case of a defective lamp.

For the purpose of limiting or regulating the no-load voltage in the series resonant circuit, the voltage drop across the resonance capacitor C30 is monitored at the tap V4 with the aid of the components R40, C38, R41, R51, D33, DZ1, R42. As long as the voltage drop across the resonance capacitor C30 undershoots the critical value, the zener diode DZ1 remains blocked and the field-effect transistor T2 receives its full control signal. However, if the amplitude of the AC voltage across the resonance capacitor C30 reaches this critical value, then while the AC voltage across the resonance capacitor C30 is traversing the negative half-wave the voltage drop between the branching point V5 and the gate of the field-effect transistor T2 will suffice to permit the zener diode DZ1 to become conductive. As a result, the control signal for the gate of the field-effect transistor T2, which is injected from the positive pole of the DC voltage supply via the resistor R38, the electrode coil E22, the primary winding of the heater transformer TR and the resistors R37, R39, is led off partly via the resistor R42, the now conducting zener diode DZ1 and the resistors R41, R51, which are now connected in parallel through the diode D33, to the negative pole of the DC voltage supply, and the input signal for the field-effect transistor T2 is correspondingly reduced. The reduced control signal at the gate of the field-effect transistor T2 reduces the conductivity of the drain-source junction of the field-effect transistor T2, and thus increases the effective emitter resistance of the bipolar transistor Q6 and thereby shortens the on duration of the transistor Q6, with the result that the clock frequency of the half-bridge inverter is increased. Since the clock frequency or switching frequency of the half-bridge inverter is higher than the resonant frequency of the series resonant circuit, the increase in the clock frequency intensifies the frequency detuning between the clock frequency or switching frequency of the half-bridge inverter and the resonant frequency of the series resonant circuit, with the result that the maximum no-load voltage achievable by means of the method of resonance amplification is reduced in accordance with this frequency detuning. It is possible by means of a suitable dimensioning of the resistors R42 and R51 for the strength of the remaining input signal at the gate of the field-effect transistor T2, and thus also for the no-load voltage in the series resonant circuit, to be adjusted to a desired value. Because of the polarity of the diode D33, only the negative half-wave of the resonance capacitor voltage is utilized for voltage regulation or voltage limitation.

In the exemplary embodiment in accordance with FIG. 2 and having the dimensioning of the components as specified in the table, the drain-source junction of the field-effect transistor T2 has a resistance of approximately 0.1 W in the fully conducting state, that is to say that an input voltage of approximately 12 V—which is the threshold voltage of the zener diode D36—is present at the gate. The voltage regulation starts when the voltage drop across the resonance capacitor C30 has reached approximately 500 V. If the voltage drop across the resonance capacitor C30 has risen to approximately 1000 V, the input signal at the gate of the field-effect transistor T2 is now only approximately 4 to 5 V, and the resistance of the drain-source junction has risen to about 1 W.

In order to switch off the half-bridge inverter Q5, Q6 for safety purposes, use is made, by contrast, of the positive half-wave of the AC voltage occurring at the resonance capacitor C30. Switching off for safety purposes in this way is performed synchronously with the blocking phase of the bipolar transistor Q6 with the aid of the bistable switching unit Q7, Q8, whose output is connected to the gate of the field-effect transistor T2. Present at the input of the bistable switching unit via the resistor R44, the rectifier diode D34 and the zener diode DZ2 is the switching-off signal, which is composed additively from two voltage components. The first voltage component of the switching-off signal is a smoothed DC voltage which is proportional to the voltage drop across the resonance capacitor C30. It is generated by means of the voltage divider resistors R40, R41, the capacitor C38 and the diode D32 at the capacitor C39. The second voltage component of the switching-off signal is a synchronisation signal which is proportional to the time-variation in the inverter output voltage at the centre tap M1. It is generated with the aid of the components C40 and R43 acting as a CR differentiating element. The CR series circuit C40, R43 differentiates the trapezoidal output voltage of the half-bridge inverter present at the centre tap, and thereby generates at the resistor R43 a square-wave voltage which forms the second voltage component of the switching-off signal. The positive half-wave of this square-wave voltage is generated by the rising edge, and the negative half-wave of the square-wave voltage is generated by the falling edge of the trapezoidal inverter output voltage. The rising edge of the trapezoidal inverter output voltage is produced at the start of the blocking phase of the bipolar transistor Q6, while the falling edge of the trapezoidal inverter output voltage is produced at the start of the blocking phase of the bipolar transistor Q5. The total switching-off signal is present at the centre tap V6 of the differentiating element C40, R43, and is fed to the input of the bistable thyristor equivalent circuit Q7, Q8 via the components R44, D34 and DZ2. These components are dimensioned such that in normal operation the critical threshold voltage of the zener diode DZ2 is undershot and the bistable switching unit Q7, Q8 remains deactivated. An anomalous operating state which has been caused, for example, by a defective lamp, causes an increased voltage drop across the capacitor C39. The positive voltage peaks of the switching-off signal, which are formed by the positive half-waves, which are added onto the capacitor voltage at C39, of the square-wave voltage of the differentiating element C40, R43, then overshoot the threshold voltage of the zener diode DZ2 and activate the thyristor equivalent circuit Q7, Q8, by means of which the field-effect transistor T2 and thus also the half-bridge transistor Q6 are switched off. The half-bridge inverter is thereby shut down and can only be restarted by renewed switching-on or by replacing the defective lamp.

TABLE

Dimensioning of the electronic components in accordance with the second exemplary embodiment, as illustrated in FIG. 2

| | |
|---|---|
| R30, R31 | 7.5 W |
| R32 | 0.47 W |
| R33 | 0.39 W |
| R34, R35, R43 | 47 W |
| R36 | 22 kW |
| R31, R38 | 560 kW |
| R39 | 330 kW |
| R40 | 974 kW |
| R41 | 110 kW |
| R42 | 120 kW |
| R44 | 2.2 kW |
| R45, R46, R47, R48 | 10 kW |
| R49 | 4.7 kW |
| R50 | 1 MW |
| R51 | 150 kW |
| C30 | 7.5 nF |
| C32, C33 | 200 nF |
| C34 | 100 nF |
| C35, C36 | 33 nF |
| C37 | 330 pF |
| C38 | 100 pF |
| C39 | 1 mF |
| C40 | 33 pF |
| C41, C42 | 560 pF |
| L30, L31 | 4.7 mH |
| L32 | 1.29 mH |
| RKa, RKb, RKc | Toroidal core R 8/4/3.8 |
| D30, D31, D37 | 1N4946 |
| D32, D33 | 1N4148 |
| D34, D35 | LL4148 |
| D36 | Zener diode, 12 V |

TABLE-continued

Dimensioning of the electronic components in accordance with the second exemplary embodiment, as illustrated in FIG. 2

| | |
|---|---|
| DZ1, DZ2 | Zener diode, 27 V |
| DC1 | 1N413M |
| Q5, Q6 | BUF 644 |
| Q7 | BC857A |
| Q8 | BC847A |
| T2 | STK14N05 |

What is claimed is:

1. A circuit arrangement for operating electric lamps, the circuit arrangement having the following features:

a self-oscillating inverter with current feedback, having at least two alternately switching transistors (Q1, Q2; Q5, Q6), a load circuit which is connected to the output of the inverter and designed as a resonant circuit (L1, C1; L32, C30), terminals for at least one electric lamp (LP; LP1, LP2), characterized in that the circuit arrangement at a transistor (T1; T2) whose control junction is arranged in the emitter line or in the source line of an inverter transistor (Q2; Q6), it being the case that the control input of the transistor (T1; T2) is connected via a first current path (R11, R8, E2; R39, R37, TR, E22, R38) to a voltage source, and the control input of this transistor (T1; T2) is connected via a second current path (R14; R42) to a voltage divider (R9, R12, R13; R40, R41, R51) which is connected via a tap (V3; V4) in the load circuit to a resonant circuit component (C1; C30).

2. The circuit arrangement according to claim 1, characterized in that the transistor (T1; T2) is a field-effect transistor.

3. The circuit arrangement according to claim 1, characterized in that a threshold element (DZ; DZ1) is arranged in the second current path.

4. The circuit arrangement according to claim 1, characterized in that the threshold element (DZ; DZ1) is a zener diode whose cathode is connected to the gate electrode of the field-effect transistor (T1; T2).

5. The circuit arrangement according to claim 4, characterized in that the second current path contains a rectifier diode (D33) oppositely polarized to the zener diode (DZ; DZ1).

6. The circuit arrangement according to claim 5, characterized in that the tap (V3; V4) in the load circuit is situated between the resonance inductor (L1; L32) and the resonance capacitor (C1; C30) of a resonant circuit, with the result that the zener diode (DZ; DZ1) detects a first half-wave of the resonance capacitor voltage of the resonant circuit (L1, C1; L32, C30).

7. The circuit arrangement according to claim 1, characterized in that the first and/or the second current path contain voltage divider resistors (R12, R13, R9; R40, R41, R51).

8. The circuit arrangement according to claim 1, characterized in that the control input of a transistor (T2), whose control junction is arranged in the emitter line or in the source line of an inverter transistor (Q6), is connected via a third current path to the output of a bistable switching device (Q7, Q8) which upon the occurrence of an anomalous operating state switches the control junction of the transistor (T2) into the high-resistance state.

9. The circuit arrangement according to claim 8, characterized in that present at the input of the bistable switching device (Q7, Q8) via a trigger (DZ2) is an electric voltage which is proportional to the time-averaged second half-wave of the resonance capacitor voltage of the resonant circuit (L32, C30).

10. An operating method for electric lamps in a circuit arrangement which has a self-oscillating inverter with current feedback, having at least two alternately switching transistors (Q1, Q2; Q5, Q6) and a load circuit connected to the inverter output and having at least one resonant circuit (L1, C1; L32, C30), characterized in that the no-load voltage in the load circuit is limited by varying the emitter resistance or the source resistance of one of the inverter transistors (Q2; Q6) as a function of the voltage drop across one of the resonant circuit components (C1; C30), the clock frequency of the inverter thereby also being varied, with the result that the difference between the inverter clock frequency and the resonant frequency of the resonant circuit is increased.

11. The operating method for electric lamps according to claim 10, characterized in that the variation in the emitter resistance or source resistance of the inverter transistor (Q2; Q6) is effected with the aid of a field-effect transistor (T1; T2) whose drain-source junction is arranged in the emitter line or source line of the inverter transistor (Q2; Q6), by continuously varying the conductivity of the drain-source junction of the field-effect transistor (T1; T2) as a function of the voltage drop across one of the resonant circuit components (C1; C30).

12. The operating method for electric lamps according to claim 11, characterized in that upon the occurrence of an anomalous operating state of the circuit arrangement, the field-effect transistor (T2) operates as a switch, and its drain-source junction is switched into the high-resistance state, with the result that the oscillation of the inverter (Q5, Q6) is interrupted.

* * * * *